Patented Nov. 20, 1928.

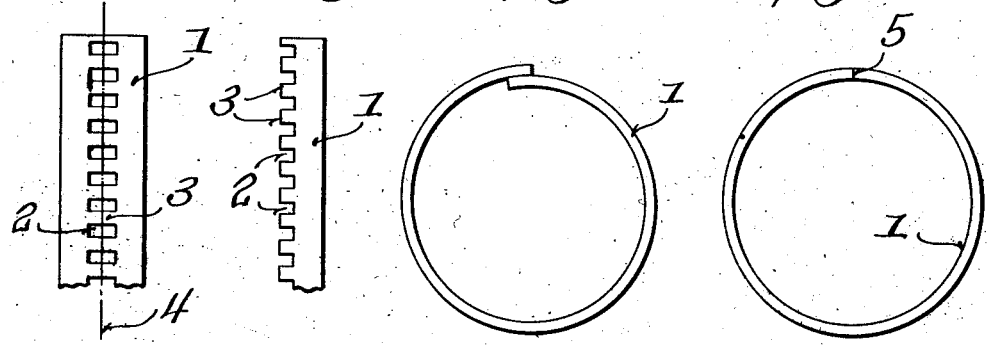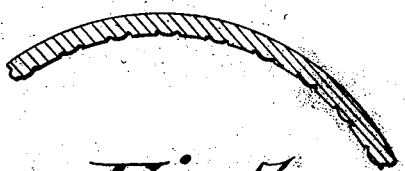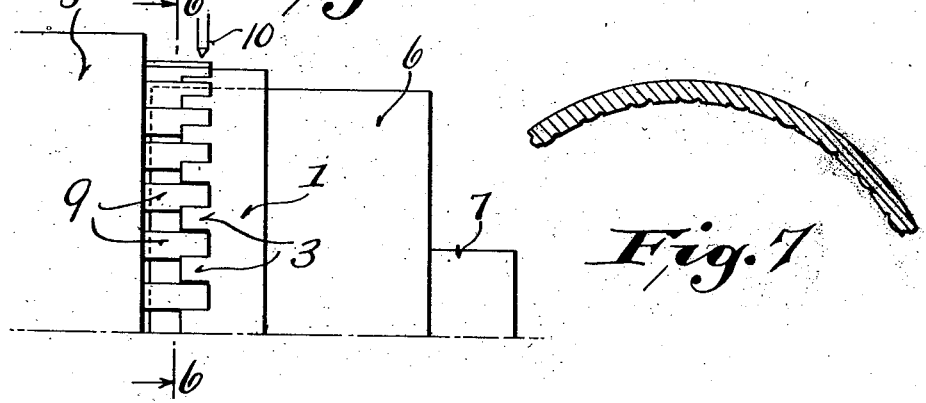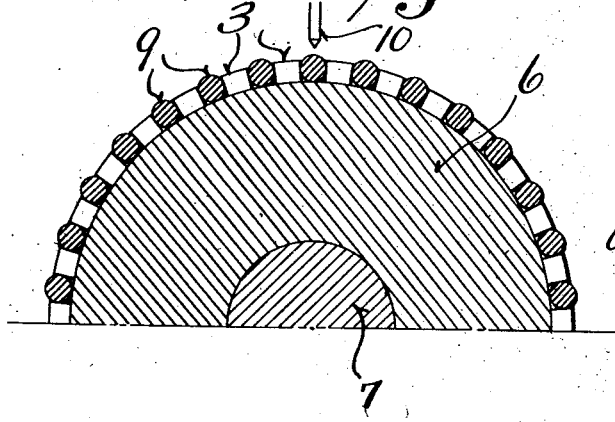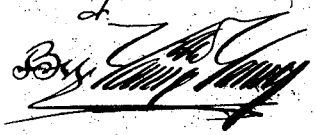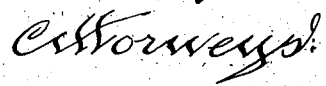

1,692,407

UNITED STATES PATENT OFFICE.

KLAUS L. HANSEN AND WILLIAM J. OESTERLEIN, OF MILWAUKEE, WISCONSIN, ASSIGNORS OF ONE-THIRD TO NORTHWESTERN MANUFACTURING COMPANY, OF MILWAUKEE, WISCONSIN, A CORPORATION OF WISCONSIN.

PROCESS OF FORMING AND WELDING END RINGS FOR ROTOR BARS.

Application filed October 26, 1925. Serial No. 65,008

This invention relates to a process of forming and welding end rings for rotor bars.

In general, this invention is an improvement over that disclosed in our Patent No. 1,546,068, issued July 14, 1925, for process of welding rotor bars.

The usual method of constructing end rings for squirrel cage rotors by punching them out of sheet copper necessarily involves considerable waste of material, and these end rings have to be subsequently brazed or soldered to the rotor bars with a spelter or solder having a high melting point. Further, the spelter or solder, such as silver solder, is expensive. Considerable effort has been directed towards the elimination of this type of end ring construction.

Various attempts have been made to weld the ends of the rotor bars but these attempts have not proven wholly satisfactory. The end rings have been cast upon the projecting ends of the rotor bars, but the physical characteristics of this cast material, especially, its electrical resistance has been found to vary considerably. A further method closely related to the cast ring method has been to melt the projecting ends of the rotor bars and control the flow of liquified material by means of a mold or similar member. An example of this process is disclosed in U. S. Patent No. 1,160,428, of November 16, 1915 issued to G. E. Markley. The use of a mold accurately fitting the ends of the rotor bars is expensive and is difficult in actual practice. Further, the physical characteristics of the cast ring as noted above, vary considerably and cannot be wholly relied upon.

This invention is designed to overcome the above noted defects and objects of such invention are to provide a method of welding rotor bars which will retain the major portion of the original physical characteristics of such bars and which does not require the use of a mold and does not produce a liquefication of the ends of the rotor bars, thus retaining the original characteristics of the usual drawn copper bars.

Further objects are to provide a process which forms a mechanically strong joint with as high a melting point as the bars themselves.

Further objects are to provide a method in which the heat may be concentrated upon a small area and flowing of the metal prevented and the major portion of the welded ends retained in their initial state.

Further objects are to provide a method of welding rotor bars in which a portion of the ends are rendered just sufficiently plastic to permit their union by the action of molecular forces of adhesion and cohesion while a large portion of such ends remain in their initial physical condition and are unchanged by this process.

Further objects are to provide a method of making the end ring for rotor bars which will produce an end ring having the major portion physically unchanged and of the same electrical characteristics as it initially had, and in which the end rings may be formed from a flat strip of material, if desired.

Further objects are to provide a method of forming end rings for rotor bars in which the end ring is provided with a series of notches on its peripheral edge adapted to receive the rotor bars and to insure the chilling of the inner side of the end ring during the welding operation, so that flowing of the metal with subsequent guiding thereof is wholly avoided, and in which the correct spacing of all of the parts is assured during the process of welding.

An embodiment of the invention is shown in the accompanying drawings, in which:—

Figure 1 shows the first step in the process of forming the end ring.

Figure 2 shows an end ring prior to shaping.

Figure 3 shows one stage in the shaping of the end ring.

Figure 4 shows the completely shaped end ring as it appears when adapted to be slipped into position.

Figure 5 shows the position of the end ring and rotor bars just prior to welding.

Figure 6 is an enlarged sectional view on the line 6—6 of Figure 5.

Figure 7 is a view corresponding to Figure 6 showing the completely welded end ring in section at the edges of the rotor bars.

In practicing this invention, a sheet of metal, such as brass or copper or other metal in the form of an elongated strip, as indicated at 1 in Figure 1, is punched to provide a plurality of regular rectangular apertures 2 along its center, such apertures being spaced apart by connecting webs 3. Thereafter, the strip is cut longitudinally along the line 4. Each of these strips, as shown in Figure 2, is used to produce an end ring. It is rolled into approximately circular form, as shown in Figure 3, with the ends overlapping. Thereafter, the ends are pulled apart and allowed to abut along the line 5, as shown in Figure 4, thus producing a circular end ring with the ends pressed tightly together by the inherent resiliency of the ring. The ring, in this condition is slipped over the chilling block 6 which may consist of a solid metal block, as shown in the drawings, or may be water cooled, as described in our above noted patent. This chilling block is slipped over the shaft 7 of the rotor 8 and the end ring 1 is slipped into position with the ends of the rotor bars 9 fitting in the notches 2 of the strip and with the webs or tongues 3 of the end ring filling the space between successive rotor bars, as illustrated particularly in Figures 5 and 6.

Thereafter, an arc is struck between the electrode 10 and the rotor bars and end ring. As shown in Figure 5, this arc may be formed directly over the axis of the rotor, if desired, and it has been found convenient to use an ordinary carbon electrode. The rotor is slowly rotated until the arc has traveled completely around the ends of the projecting rotor bars and the intermeshing tongues 3 of the end strip.

At any suitable stage in the process, the butt joint 5 (see Figure 4) may be welded. This joint, if desired, may be welded prior to the welding of the rotor bars to the end rings.

It is to be noted that the rotor bar ends are not liquefied in this process. They are rendered sufficiently plastic adjacent their upper halves so that they unite under the action of molecular forces of adhesion and cohesion. The inner side of the rotor bars and the inner side of the end ring are maintained chilled by the chilling block 6, so that the physical characteristics are not altered at this portion of the completed end ring, and further there is a minimum of alteration of the physical characteristic of the rotor bar ends and the adjacent ring when this process is practiced.

It is to be distinctly understood that the ends of the bars and the tongues 3 of the end ring are not fused as has previously been done, but they are softened throughout a portion of their extent to permit the forces noted above to act in the manner described and to secure a complete union of the adjacent parts.

The heat is highly localized in this process and the physical characteristic of the bars are substantially unaltered, thus producing and end ring having low electrical resistance and great mechanical strength.

It is to be distinctly noted that no trough nor mould is required as the bar ends are not liquefied and as there is no flow of liquid metal which need be controlled. Also an extremely simple device may be employed in carrying out this process.

It is to be noted further that a minimum of machining is necessary for the completed end ring as the parts are retained in approximately their initial shape and relation so that a very smooth welded joint is secured free from humps or projections. It may be found for certain processes that no machining at all is required as the major portion of the end ring and of the ends of the rotor bars are unchanged.

Not only does this process vastly simplify the welding of rotor bar and cheapen the process, but in addition thereto it provides an electrical joint having greater conductivity than the joints heretofore possible due to the fact that the physical characteristics or rotor bar ends are no materially altered, and the high conductivity of the rotor bars is maintained even at this joint.

Although the invention has been described in considerable detail, it is to be understood that the invention may be variously embodied and is, therefore, to be limited only as claimed.

We claim:

The method of making end rings for rotor bars comprising forming a strip with notches in its marginal edge, with solid portions between said notches, positioning the projecting rotor bars in said notches with the intermediate solid portions of the strip positioned between successive rotor bars, and arc welding the rotor bars to the intermediate portion whereby a localized application of intense heat is secured and whereby the main body and the intermediate portions of the strip retain their original characteristic.

In testimony that we claim the foregoing we have hereunto set our hands at Milwaukee, in the county of Milwaukee, and State of Wisconsin.

KLAUS L. HANSEN.
WILLIAM J. OESTERLEIN.